US008037131B2

(12) United States Patent
Nagasaka (10) Patent No.: US 8,037,131 B2
(45) Date of Patent: *Oct. 11, 2011

(54) DATA TRANSFER UTILIZING PREVIEW DATA (75) Inventor: Fumio Nagasaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/606,838

(22) Filed: Oct. 27, 2009

(65) Prior Publication Data
US 2010/0094932 A1    Apr. 15, 2010

Related U.S. Application Data (63) Continuation of application No. 11/208,606, filed on Aug. 23, 2005, now Pat. No. 7,711,766, which is a continuation of application No. 10/289,390, filed on Nov. 7, 2002, now Pat. No. 6,981,053, which is a continuation of application No. 09/210,764, filed on Dec. 14, 1998, now Pat. No. 6,505,252.

(30) Foreign Application Priority Data

Dec. 24, 1997  (JP) ........................................ 9-367107
Feb. 16, 1998  (JP) ...................................... 10-051360

(51) Int. Cl.
G06F 15/16    (2006.01)
(52) U.S. Cl. ..................... 709/203; 709/217; 709/219
(58) Field of Classification Search .................. 709/227, 709/228, 200, 217, 219, 203; 379/202.01
See application file for complete search history.

(56) References Cited

U.S. PATENT DOCUMENTS
5,508,733 A    4/1996 Kassatly
(Continued)

FOREIGN PATENT DOCUMENTS
EP    0 696 121    2/1996
(Continued)

OTHER PUBLICATIONS

A. Ortega et al., Proceedings of the Conference on Computer Communications (INFOCOM), "A Framework for Optimization of a Multiresolution Remote Image Retrieval System," vol. 2, Jun. 12, 1994.

(Continued)

Primary Examiner — Frantz Jean
(74) Attorney, Agent, or Firm — Oblon, Spivak, McClelland, Maier & Neustadt, L.L.P.

(57) ABSTRACT

A method of transmitting data between a transmitter and a receiver each connected to a network, including causing the transmitter to transmit reduced image data, corresponding to image data, and user interface data to the receiver via the network, the reduced image data generated by a data-skipping operation; causing the receiver to output visibly a reduced image and a user interface image represented by the user interface data, when the receiver receives the reduced image data and the user interface data; causing the receiver to transmit a request for transfer of the image data and setting information to the transmitter, when an instruction for transfer of the image data and the setting information is input into the receiver; and causing the transmitter to transmit the image data and at least part of the setting information to at least one of the receiver and an apparatus connected to the network.

3 Claims, 6 Drawing Sheets

U.S. PATENT DOCUMENTS

| | | | |
|---|---|---|---|
| 5,534,911 A | 7/1996 | Levitan | |
| 5,619,624 A * | 4/1997 | Schoenzeit et al. | 345/418 |
| 5,664,046 A | 9/1997 | Abecassis | |
| 5,748,342 A | 5/1998 | Usami | |
| 5,760,917 A | 6/1998 | Sheridan | |
| 5,809,145 A | 9/1998 | Slik et al. | |
| 5,844,689 A | 12/1998 | Kawase | |
| 5,847,848 A | 12/1998 | Suzuki et al. | |
| 5,857,181 A * | 1/1999 | Augenbraun et al. | 1/1 |
| 5,905,866 A * | 5/1999 | Nakabayashi et al. | 709/223 |
| 5,991,783 A | 11/1999 | Popa et al. | |
| 6,018,363 A | 1/2000 | Horii | |
| 6,072,934 A | 6/2000 | Abecassis | |
| 6,118,442 A | 9/2000 | Tanigawa | |
| 6,208,837 B1 | 3/2001 | Koh et al. | |
| 6,222,545 B1 * | 4/2001 | Suzuki et al. | 345/418 |
| 6,505,252 B1 | 1/2003 | Nagasaka | |
| 6,519,049 B1 | 2/2003 | Nagasaka | |
| 6,981,053 B2 | 12/2005 | Nagasaka | |
| 6,995,855 B2 | 2/2006 | Nagasaka | |
| 2005/0237552 A1 | 10/2005 | Nagasaka | |
| 2005/0275890 A1 | 12/2005 | Nagasaka | |

FOREIGN PATENT DOCUMENTS

| | | |
|---|---|---|
| EP | 0 737 930 | 10/1996 |
| JP | 357046571 A | 3/1982 |
| JP | 404037245 A | 2/1992 |
| JP | 6-296212 | 10/1994 |
| JP | 7-212403 | 8/1995 |
| JP | 9-198206 | 7/1997 |
| JP | 9-223096 | 8/1997 |
| JP | 9-231022 | 9/1997 |
| JP | 9-325928 | 12/1997 |
| WO | WO 92/05655 | 4/1992 |

OTHER PUBLICATIONS

Terese Lau, Scaling New Heights in Technical Communication, "Building a Hypermedia Information System on the Internet," pp. 192-197, Sep. 28, 1994.

"Internet Access: HP Announces HP Instant Delivery Software for Convenient, Unattended Web Printing," Edge: Work-Group Computing Report, Oct. 12, 1998.

* cited by examiner

DATA TRANSFER UTILIZING PREVIEW DATA

CROSS REFERENCE TO RELATED APPLICATIONS

This application is a continuation application of U.S. Ser. No. 11/208,606, filed Aug. 23, 2005 now U.S. Pat. No. 7,711,766, the entire contents of which is incorporated herein by reference. U.S. Ser. No. 11/208,606 is a continuation application of U.S. Ser. No. 10/289,390, filed Nov. 7, 2002, now U.S. Pat. No. 6,981,053, which in turn is a continuation application of U.S. Ser. No. 09/210,764, filed Dec. 14, 1998, now U.S. Pat. No. 6,505,252, which in turn claims priority to Japanese Patent Application Nos. 9-367107, filed Dec. 24, 1997, and 10-051360, filed Feb. 16, 1998.

BACKGROUND OF THE INVENTION

1. Field of the Invention

The present invention relates to a technique for transmitting data between apparatuses respectively connected to a network.

2. Description of the Related Art

Facsimile and E-mail are known means for transmitting image data between apparatuses respectively connected to a telephone communication network, the Internet, or an intranet.

These known means transmit image data irrespective of the intentions of a receiver, and do not allow the receiver to selectively receive only the required image data. The image data generally has an extremely large data capacity. In the case where the transmitted image data is not required, such data transmission wastefully consumes the communication resources as well as the resources in the receiver, such as printing paper (in the case of facsimile) and the data storage area (in the case of E-mail).

SUMMARY OF THE INVENTION

The object of the present invention is thus to provide a data transfer system and a method of data transmission that allow a receiver to selectively receive only required data.

At least part of the above and the other related objects is realized by a data transfer system including: a transmitter; and a receiver connected to the transmitter via a network. The transmitter includes a memory that stores original data, a first transmission unit that transmits the original data and preview data created corresponding to the original data, and a first controller that controls operation of the transmitter. The receiver includes a second transmission unit that receives at least the preview data, an input unit, an output unit, and a second controller that controls operation of the receiver. The first controller causes the first transmission unit to send the preview data to the receiver, whereas the second controller receives the preview data from the second transmission unit and subsequently causes the output unit to output a preview image represented by the preview data. The second controller causes the second transmission unit to send a request for transfer of the original data to the transmitter when an instruction for transfer of the original data is input into the receiver via the input unit. The first controller causes the first transmission unit to send the original data stored in the memory to at least one of the receiver and another apparatus connected to the network when receiving the request for transfer of the original data from the first transmission unit.

The present invention is also directed to a transmitter for transmitting data to a receiver via a network. The transmitter includes: a memory that stores original data; a transmission unit that transmits the original data and preview data created corresponding to the original data; and a controller that controls operation of the transmitter. The controller causes the transmission unit to send the preview data to the receiver. The controller causes the transmission unit to send the original data stored in the memory to at least one of the receiver and another apparatus connected to the network when receiving a request for transfer of the original data transmitted from the receiver via the transmission unit.

The present invention is also directed to a receiver for receiving data from a transmitter via a network. The receiver includes: a transmission unit that receives at least preview data created corresponding to original data; an input unit; an output unit; and a controller that controls operation of the receiver. The controller causes the output unit to output a preview image represented by the preview data when receiving the preview data transmitted from the transmitter via transmission unit. The controller causes the transmission unit to send a request for transfer of the original data to the transmitter when an instruction for transfer of the original data is input into the receiver via the input unit.

The present invention is also directed to a method of transmitting data between a transmitter and a receiver each connected to a network. The method includes the steps of: (a) causing the transmitter to transmit preview data created corresponding to original data to the receiver; (b) causing the receiver to output a preview image represented by the preview data when the receiver receives the preview data; (c) causing the receiver to transmit a request for transfer of the original data to the transmitter when an instruction for transfer of the original data is input into the receiver; and (d) causing the transmitter to transmit the original data to at least one of the receiver and another apparatus connected to the network when the transmitter receives the request for transfer.

The present invention is also directed to a computer program product that causes a computer to transmit data to a receiver via a network. The computer program product includes: a computer readable medium; a first program code unit that causes the computer to transmit preview data created corresponding to original data to the receiver; a second program code unit that causes the computer to receive a request for transfer of the original data when the receiver transmits the request for transfer; and a third program code unit that causes the computer to transmit the original data to at least one of the receiver and another apparatus connected to the network, when the computer receives the request for transfer, wherein each of the program code units is stored on the computer readable medium.

The present invention is also directed to a computer program product that causes a computer to receive data from a transmitter via a network. The computer program product includes: a computer readable medium; a first program code unit that causes the computer to receive preview data created corresponding to original data when the transmitter transmits the preview data; a second program code unit that causes the computer to output a preview image represented by the preview data when the computer receives the preview data; and a third program code unit that causes the computer to transmit a request for transfer of the original data to the transmitter when the computer receives an instruction for transfer of the original data, wherein each of the program code units is stored on the computer readable medium.

In the arrangement of the present invention, the transmitter transmits the preview data, which has been created corresponding to the original data, to the receiver. The receiver then outputs the preview image represented by the transmitted preview data to enable the visual check. For example, the receiver causes the preview image represented by the preview data to be displayed on the screen of a monitor or to be printed on printing paper by a printer, in order to enable the user to visually check the output.

The user of the receiver visually checks the preview image represented by the preview data and determines whether or not the original data corresponding to the preview data. In the case where the corresponding original data is required, the user inputs an instruction for transfer of the original data to the receiver through the operation of the input unit. The receiver transmits a request for transfer of the original data to the transmitter in response to the input instruction. The transmitter receives the request for transfer and transmits the required original data to a preset apparatus. The preset apparatus may be identical with or different from the receiver.

The data transfer system of the present invention transmits the preview data irrespective of the intentions of the user of the receiver. The preview data has, however, an extremely smaller data capacity than that of the original data. This accordingly does not wastefully consume the communication resources or the resources of the receiver. The receiver visually checks the contents of the preview data and issues a request for transfer of only the required original data, so as to enable only the required original data to be received by a preset apparatus. This arrangement effectively prevents the communication resources and the resources in the receiver from being wastefully consumed.

These and other objects, features, aspects, and advantages of the present invention will become more apparent from the following detailed description of the preferred embodiments with the accompanying drawings.

DESCRIPTION OF THE PREFERRED
EMBODIMENTS

Figure 1:
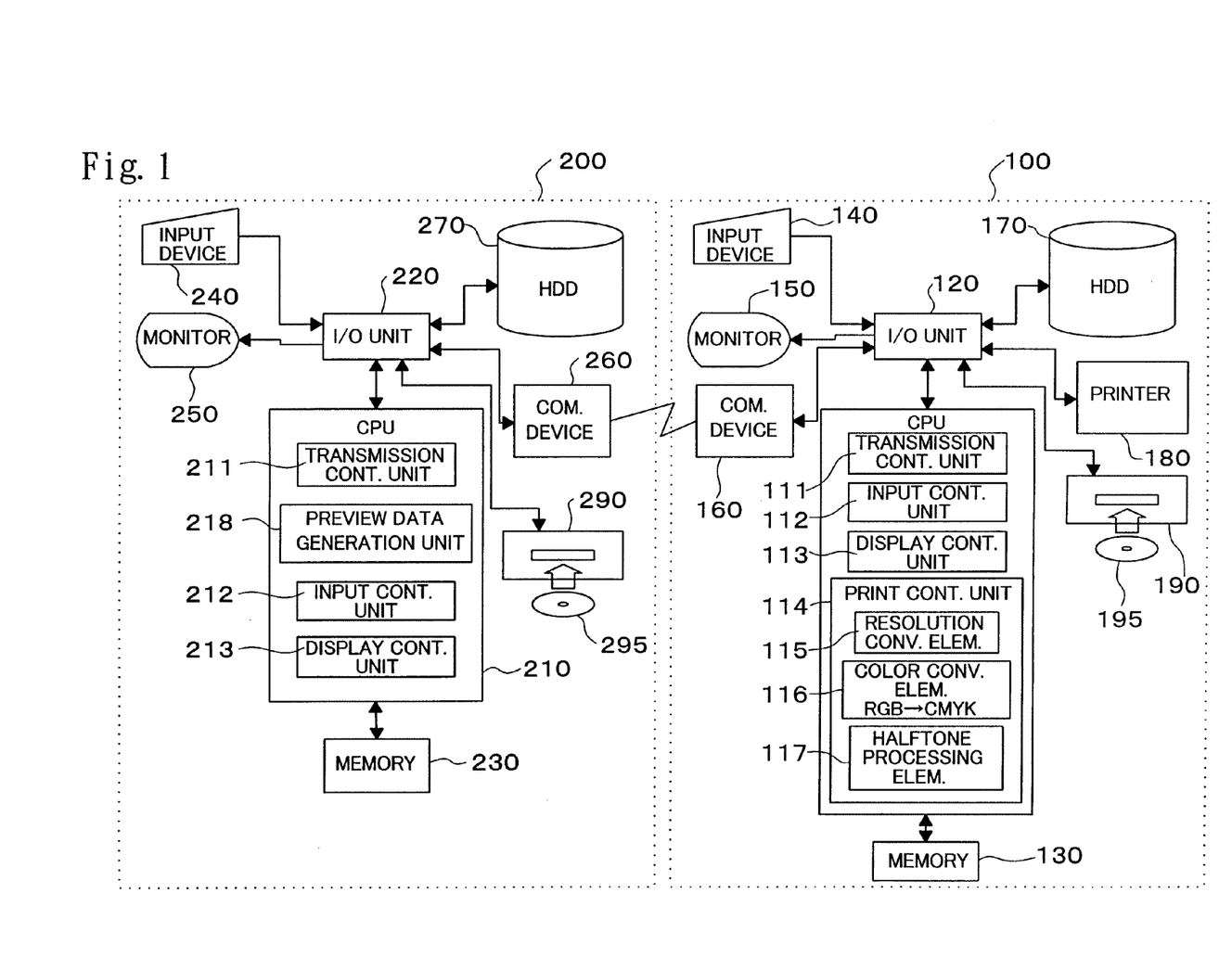
FIG. 1 is a block diagram illustrating an image data transfer system in a first embodiment according to the present invention.
Figure 2:
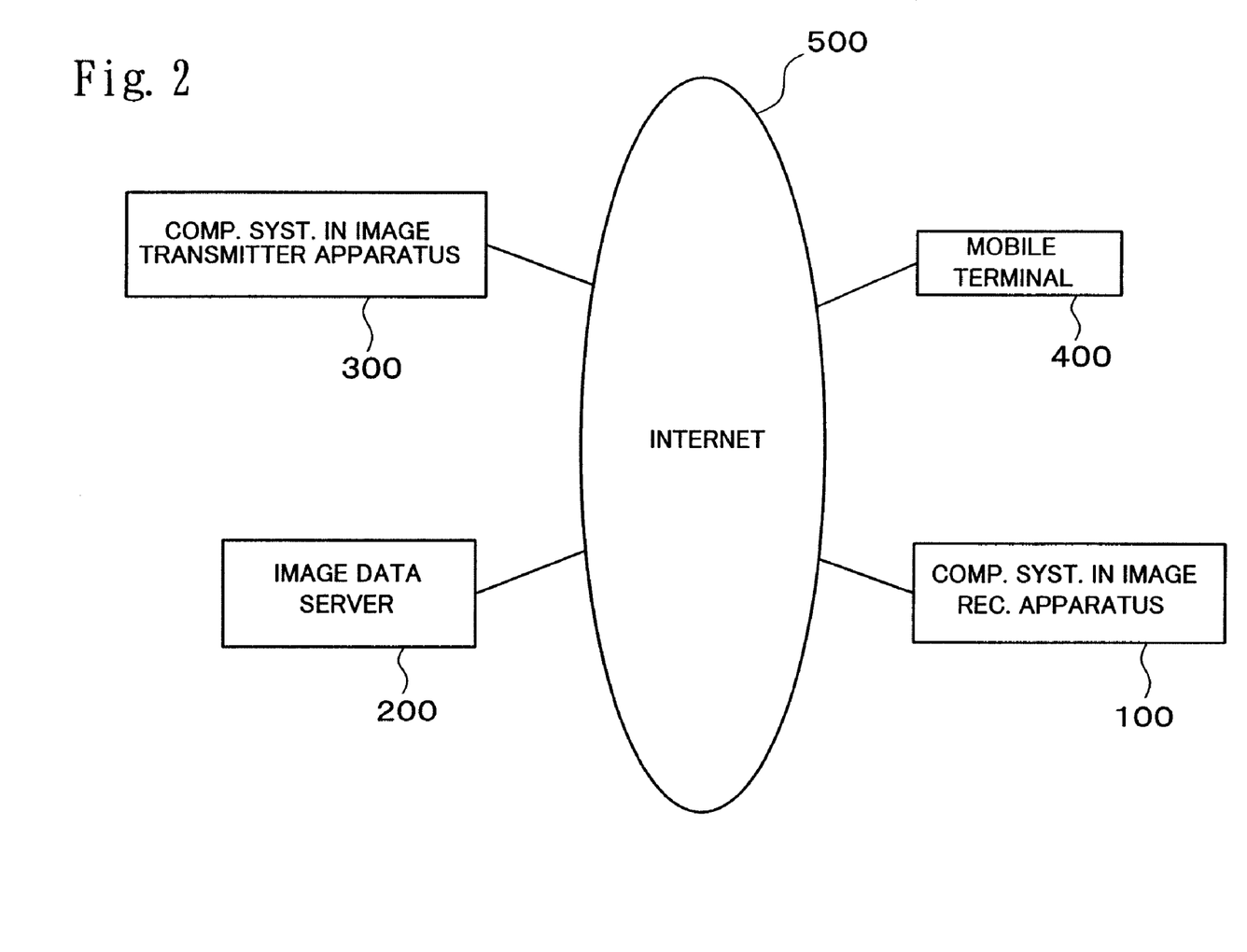
FIG. 2 shows an example of the image data transfer system of FIG. 1 actualized on the Internet.

FIG. 1 is a block diagram illustrating an image data transfer system in a first embodiment according to the present invention. FIG. 2 shows an example of the image data transfer system of FIG. 1 actualized on the Internet.

The image data transfer system of the embodiment includes a computer system 100 in an image receiver apparatus and an image data server 200. The computer system 100 in the image receiver apparatus is connected with the image data server 200 via the Internet 500 as shown in FIG. 2. A computer system 300 in an image transmitter apparatus as well as a mobile terminal 400 is also connected to the Internet 500. Although the respective apparatuses are directly connected to the Internet in the illustration of FIG. 2, these apparatuses are generally connected to the Internet 500 indirectly via a telephone communication network or another network, such as LAN.

Referring to FIG. 1, the computer system 100 in the image receiver apparatus includes a CPU 110 that carries out a variety of processing and control operations according to computer programs, an I/O unit 120 that transmits data to and from a variety of peripheral devices, and a memory 130, in which the computer programs are stored and data obtained in the course of processing are temporarily registered. The computer system 100 further includes an input device 140 that is used to input, for example, an instruction from a user, a monitor 150, on which the contents of data are displayed, a communication device 160 that communicates with another apparatus via the network, a hard disk drive 170, in which a variety of data are stored, a printer 180 that is used to print the contents of data, and a CD-ROM drive 190.

The CPU 110 carries out the processing and control operations according to the computer programs, so as to function as a transmission control unit 111, an input control unit 112, a display control unit 113, and a print control unit 114.

Like the computer system 100 in the image receiver apparatus, the image data server 200 includes a CPU 210, an I/O unit 220, a memory 230, an input device 240, a monitor 250, a communication device 260, a hard disk drive 270, and a CD-ROM drive 290.

The CPU 210 carries out a variety of processing and control operations according to computer programs stored in the memory 230, so as to function as a transmission control unit 211, an input control unit 212, a display control unit 213, and a preview data generation unit 218.

In this embodiment, the computer programs (that is, applications programs) recorded in recording media, CD-ROMs 195 and 295 are respectively read by the CD-ROM drives 190 and 290 and taken into the computer system 100 in the image receiver apparatus and the image data server 200. The input computer programs are transferred to the hard disk drives 170 and 270 and transmitted to the memories 130 and 230, for example, at the time of starting the operation.

This embodiment utilizes the CD-ROMs as the recording media, in which the computer programs are recorded in a computer readable manner. A variety of other computer readable media may also be used for the recording media; for example, flexible disks, magneto-optic discs, IC cards, ROM cartridges, punched cards, prints with bar codes or other codes printed thereon, and internal storage devices (memories, such as RAM and ROM) and external storage devices of the computer.

Instead of reading the computer programs stored in such recording media, the user may access a program server (not shown) for supplying computer programs via the network and take the computer programs from the program server into the computer system 100 in the image receiver apparatus or the image data server 200.

Part of the computer programs may be replaced by the operating system.

In this embodiment, the software actualizes the functions of the transmission control unit 111, the input control unit 112, the display control unit 113, and the print control unit 114 in the computer system 100 of the image receiver apparatus as well as the transmission control unit 211, the input control unit 212, the display control unit 213, and the preview data generation unit 218 in the image data server 200. The functions of these units may otherwise be actualized by the hardware structure.

Figure 3:
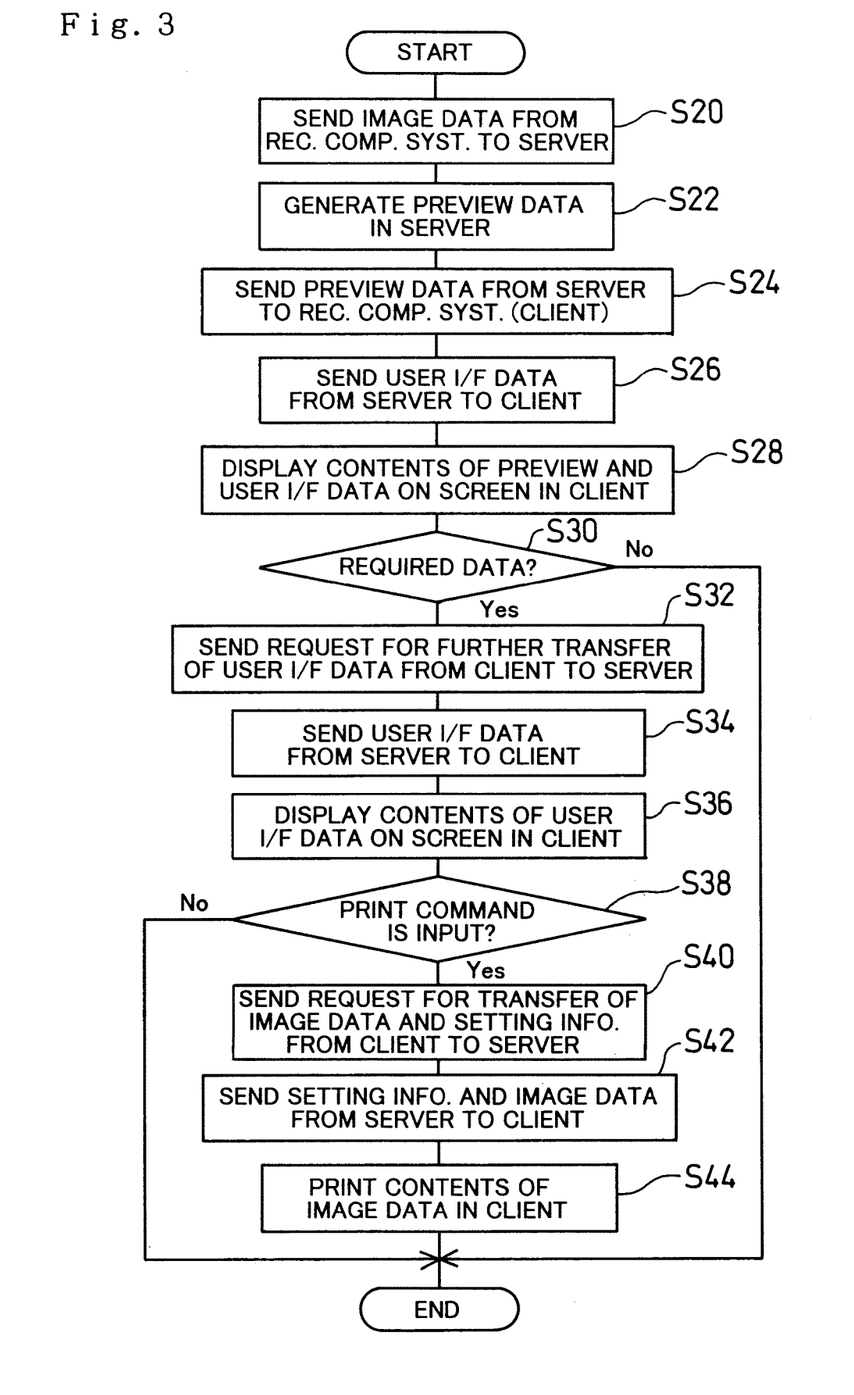
FIG. 3 is a flowchart showing a processing routine executed in the data transfer system of FIG. 1.

FIG. 3 is a flowchart showing a processing routine executed in the data transfer system of FIG. 1. The fundamental operation of this embodiment is described by referring to the flowchart of FIG. 3. Here it is assumed that required image data is transferred from the computer system 300 in the image transmitter apparatus to the computer system 100 in the image receiver apparatus.

Referring to FIG. 2, the computer system 300 in the image transmitter apparatus transmits required image data to the image data server 200 via the Internet at step S20. The image data, for example, consists of gray-scaled bit-map data of R, G, and B. In the image data server 200 shown in FIG. 1, the communication device 260 receives the transmitted image data, and the transmission control unit 211 of the CPU 210 stores the input image data into the hard disk drive 270 via the I/O unit 220. The hard disk drive 270 stores such transmitted image data as well as user interface data discussed later.

The preview data generation unit 218 reads the image data from the hard disk drive 270, generates preview data based on the input image data, and stores the preview data into the hard disk drive 270 at step S22. One concrete procedure causes the image data to undergo an image processing operation, such as a data skipping operation, and generates reduced image data as the preview data. Another concrete procedure extracts attribute information (for example, the creator or transmitter of the image, the date of creation, the name and the type of the image) from the information attached to the image data and generates attribute data as the preview data.

The transmission control unit 211 subsequently reads the generated preview data from the hard disk drive 270 and transmits the input preview data via the communication device 260 to the client or the computer system 100 in the image receiver apparatus at step S24. The transmission control unit 211 also reads the user interface data from the hard disk drive 270 and transmits the input user interface data to the computer system 100 in the image receiver apparatus at step S26.

In the computer system 100 of the image receiver apparatus, the communication device 160 receives the transmitted preview data and user interface data, and the transmission control unit 111 of the CPU 110 stores the input preview data and user interface data into the hard disk drive 170 via the I/O unit 120.

When the user of the computer system 100 in the image receiver apparatus inputs an instruction for displaying a preview image through the operation of the input device 140, the input control unit 112 transmits the instruction to the display control unit 113. The display control unit 113 then reads the preview data and the user interface data from the hard disk drive 170 and causes the contents of the preview data and the user interface data to be displayed on the screen of the monitor 150 at step S28. A preview image corresponding to the preview data is accordingly displayed in a window based on the user interface data on the screen of the monitor 150.

The user checks the displayed preview image and determines whether or not the original image data corresponding to the preview data is required at step S30. When the corresponding original image data is not required, the user inputs an instruction for terminating the display of the preview image and concludes a series of the processing. When the corresponding original image data is required, on the other hand, the user inputs an instruction for displaying a window for print settings, that is, a window for enabling input of various pieces of setting information that are used to print the image represented by the original image data on a sheet of printing paper. In one exemplified structure, the user interface data provides specific buttons in the window that respectively correspond to the instruction for terminating the display of the preview image and the instruction for displaying the window for print settings. The user clicks the required button through the operation of the input device 140 to input the desired instruction.

In the case where the instruction for displaying the window for print settings is input, the input control unit 112 transfers the instruction to the transmission control unit 111, and the transmission control unit 111 transmits a request for transfer of the required user interface data, which is used to display the window for print settings, via the communication device 160 to the image data server 200 at step S32.

In the image data server 200, the communication device 260 receives the transmitted request for transfer, and the transmission control unit 211 reads the user interface data, which is used to display the window for print settings, from the hard disk drive 270 and transmits the input user interface data to the computer system 100 in the image receiver apparatus via the communication device 260 at step S34.

In this embodiment, the user interface data provided in the image data server 200 is not exclusively used by the computer system 100 of the image receiver apparatus, but is generally used by a large number of clients connected to the Internet 500. The user interface data thus mainly consists of HTML data written in HTML (HyperText Markup Language).

The Internet 500 is in the environment where various machine types coexist. It is difficult for the image data server 200 to check the machine type of each client. In the case where the user interface data is generated according to a program that depends upon a specific machine type and is supplied to each client, some clients naturally can not utilize the user interface data. It is, however, practically impossible to provide the user interface data for each machine type and supply the required user interface data corresponding to the machine type of each client. This embodiment thus generates the user interface data written in the HTML that is independent of the machine type and is easily utilized.

The HTML data includes image data, such as GIF (graphics Interchange Format) and JPEG (Joint Photographic Experts Group), and other data related thereto with predetermined tags. Data written in JAVA (a programming language developed by Sun Microsystems Corp.) that is also independent of the machine type may be used instead of the HTML data.

In the computer system 100 of the image receiver apparatus, when the communication device 160 receives the transmitted user interface data, while the transmission control unit 111 stores the input user interface data into the hard disk drive 170, the display control unit 113 displays the user interface window represented by the user interface data, that is, the window for print settings, on the screen of the monitor 150 at step S36. As described previously, the user interface data is the HTML data and thus readily displayed using a known Web browser software.

Figure 4:
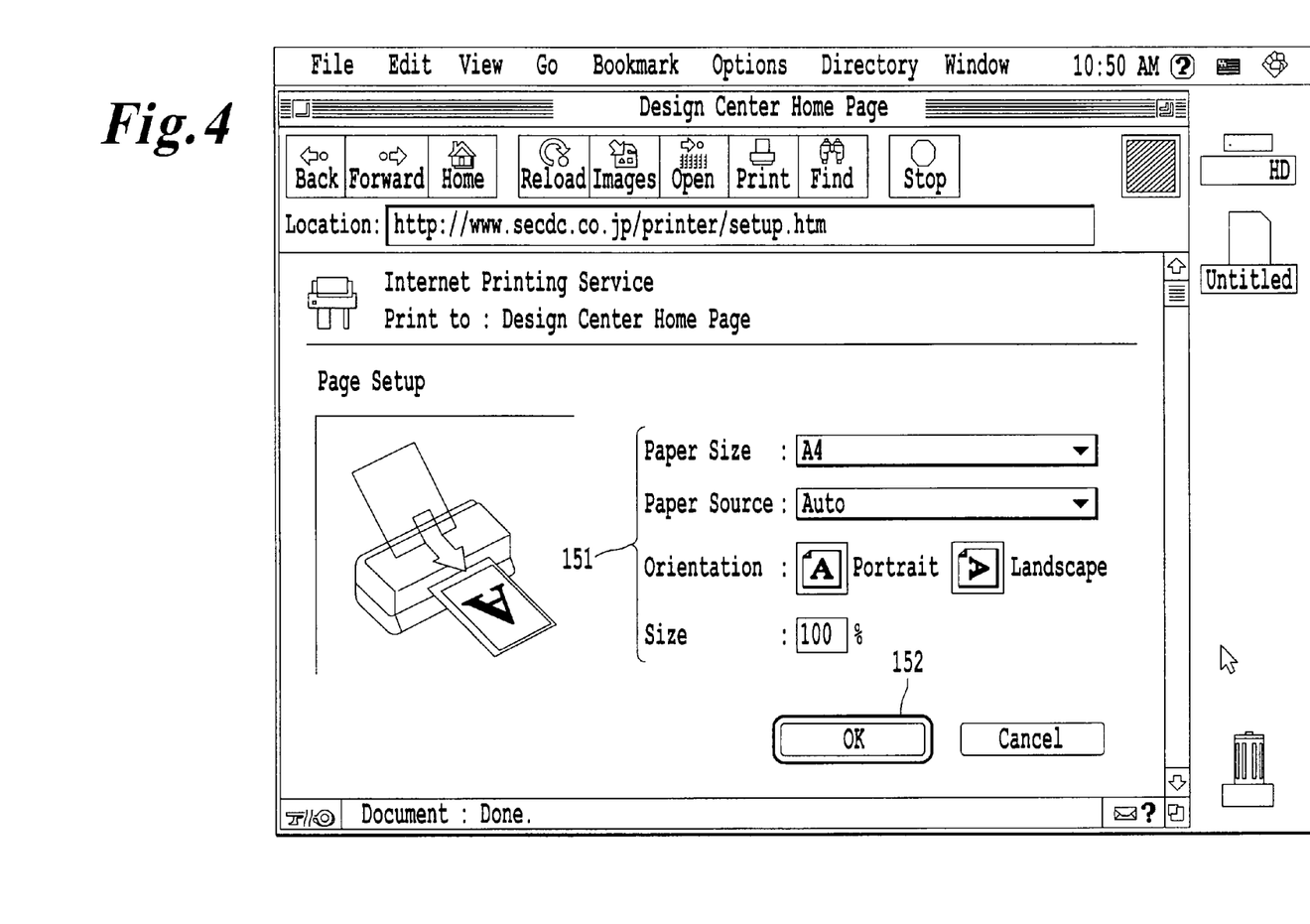
FIG. 4 shows one exemplified window for print settings displayed on the screen of a monitor 150 based on user interface data.
Figure 5:
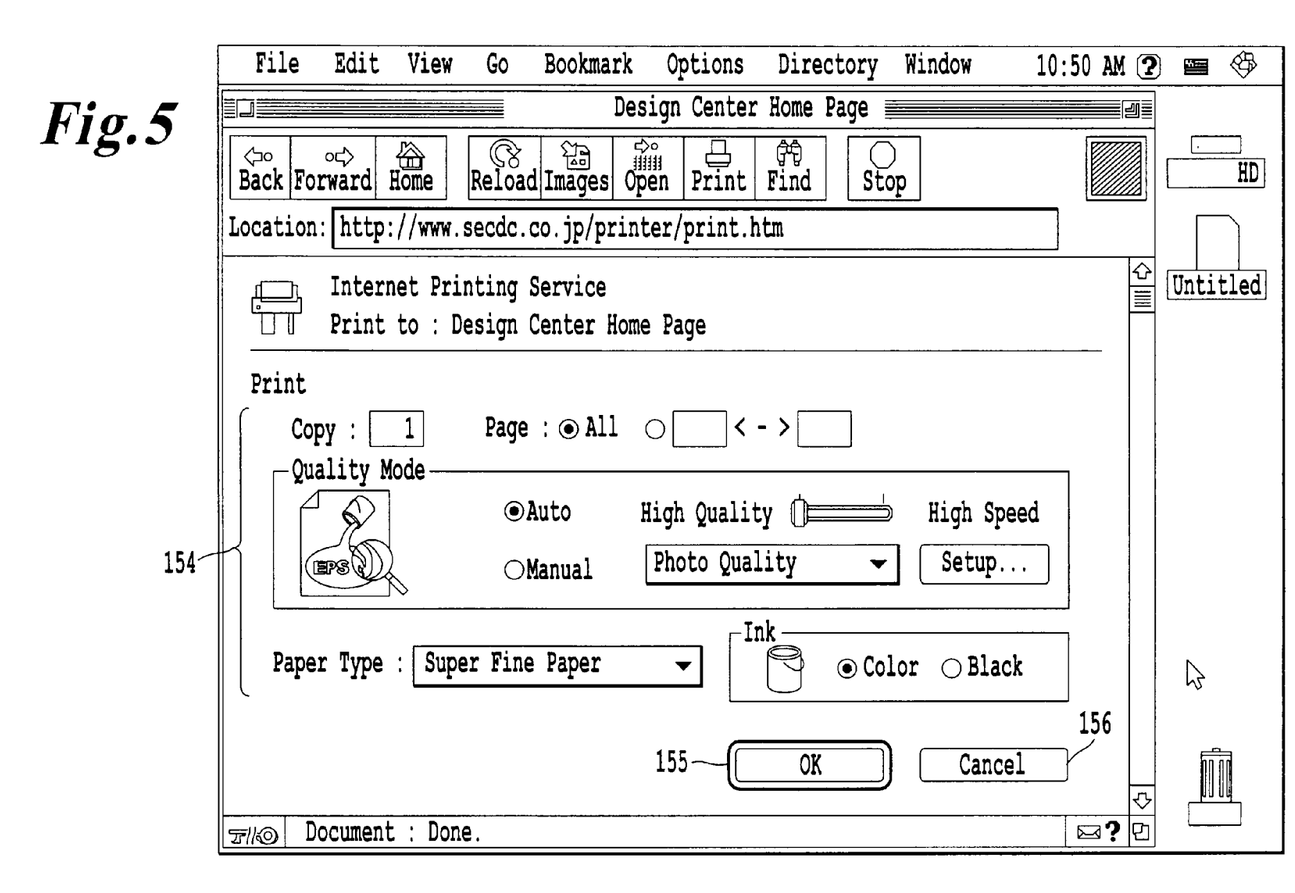
FIG. 5 shows another exemplified window for print settings displayed on the screen of the monitor 150 based on the user interface data.

FIGS. 4 and 5 respectively show exemplified windows for print settings displayed on the screen of the monitor 150, based on the transmitted user interface data. FIG. 4 shows the window for paper settings, and FIG. 5 shows the window for print specification.

The window for paper settings as shown in FIG. 4 is first displayed on the screen of the monitor 150. The user of the computer system 100 in the image receiver apparatus inputs details of paper settings 151, which include the paper size, the paper source, the orientation, and the print size, corresponding to the printing paper set in the printer 180 through the operation of the input device 140. On conclusion of the input, the user clicks an OK button 152. This causes the window for print specification as shown in FIG. 5 to appear. The user then inputs details of print specification 154, which include the number of copies, the printing range, the printing quality, the paper type, and the ink color, according to the requirements through the operation of the input device 140. At step S38, the user clicks an OK button 155 when it is required to transmit the original image data and print the image represented by the original image data, whereas the user clicks a Cancel button 156 when it is not required.

The input control unit 112 transmits the various pieces of input setting information and the results of button clicking to the transmission control unit 111. In the case where the Cancel button 156 is clicked in the window for print specification, the transmission control unit 111 concludes the series of processing. In the case where the OK button 155 is clicked in the window for print specification, on the other hand, the transmission control unit 111 transmits a request for transfer of the original image data as well as the input setting information to the image data server 200 via the communication device 160 at step S40.

In the image data server 200, when the communication device 260 receives the transmitted request for transfer and setting information, the transmission control unit 211 transmits back all or part of the setting information via the communication device 260 to the computer system 100 in the image receiver apparatus at step S42. As described previously, the user interface data fed from the image data server 200 to the computer system 100 in the image receiver apparatus is the HTML data. The user interface data may thus have a mechanism for calling a software component, in order to utilize a CGI (Common Gateway Interface) function on the image data server 200. This embodiment takes advantage of this mechanism set in the user interface data and causes the setting information transmitted from the computer system 100 in the image receiver apparatus to be transmitted back from the image data server 200 to the computer system 100 in the image receiver apparatus.

Simultaneously with transmitting back the setting information, the transmission control unit 211 reads the original image data, which is the target of the request for transfer, from the hard disk drive 270 and transmits the original image data via the communication device 260 to the computer system 100 in the image receiver apparatus at step S42.

In the computer system 100 of the image receiver apparatus, when the communication device 160 receives the transmitted setting information and the original image data, the transmission control unit 111 transfers the input setting information and original image data to the print control unit 114. The print control unit 114 is actualized by a printer driver software, which is exclusive for the printer 180, and includes a resolution conversion element 115, a color conversion element 116, and a halftone processing element 117 as shown in FIG. 1.

The respective constituents of the print control unit 114 cause the input image data to be subjected to the following processing operations, in order to create a desired printed image based on the input setting information. The resolution conversion element 115 first performs a resolution conversion process, such as interpolation or data skipping, for the input image data, so as to cause a printed image to have a desired resolution. The color conversion element 116 then converts the RGB image data into, for example, CYMK data corresponding to the input of the printer 180. The halftone processing element 117 subsequently carries out a known dither operation or error diffusion operation for the image data, so as to cause the printed image to attain a desired tone expression.

On conclusion of the processing, the print control unit 114 outputs the processed image data via the I/O unit 120 to the printer 180, so that the printer 180 prints an image corresponding to the image data on the printing paper at step S44.

In this manner, the image data is transmitted from the computer system 300 of the image transmitter apparatus via the image data server 200 to the computer system 100 of the image receiver apparatus and is printed in the computer system 100 of the image receiver apparatus. The user of the computer system 100 in the image receiver apparatus can thus receive a desired image.

As described above, in this embodiment, the image data server 200 generates preview data corresponding to the input image data and transmits the preview data to the computer system 100 of the image receiver apparatus. This means that the preview data is transmitted to the computer system 100 of the image receiver apparatus, irrespective of the intentions of the user of the computer system 100 in the image receiver apparatus (that is, the receiver). The preview data has, however, an extremely smaller data capacity than that of the original image data and thereby does not significantly increase the traffics on the Internet 500 nor wastefully consumes the communication resources. The preview data does not wastefully consume the storage capacity of the hard disk drive 170 in the computer system 100 of the image receiver apparatus.

The arrangement of the embodiment enables the user of the computer system 100 in the image receiver apparatus to check the contents of the preview data and issue a request for transfer with respect to only the required original image data, so as to selectively receive only the required original image data. This effectively prevents the communication resources and the resources in the receiver apparatus from being wastefully consumed.

In this embodiment, the computer system 100 in the image receiver apparatus utilizes the user interface data provided by the image data server 200. Namely the computer system 100 in the image receiver apparatus is not required to provide a special user interface for displaying the window for print settings. A modification of the user interface data in the image data server 200 enables the user interfaces to be changed at the same time in all the clients that utilize the user interface data. This facilitates the maintenance and management of the user interface. As discussed previously, the user interface data consists of the HTML data and is thereby independent of the machine type of the client.

In the first embodiment discussed above, the original image data is transmitted to the apparatus that receives the transmitted preview data. In accordance with another configuration, the apparatus that receives the transmitted preview data may be different from the apparatus that receives the transmitted original image data. The following describes such configuration as another embodiment.

Figure 6:
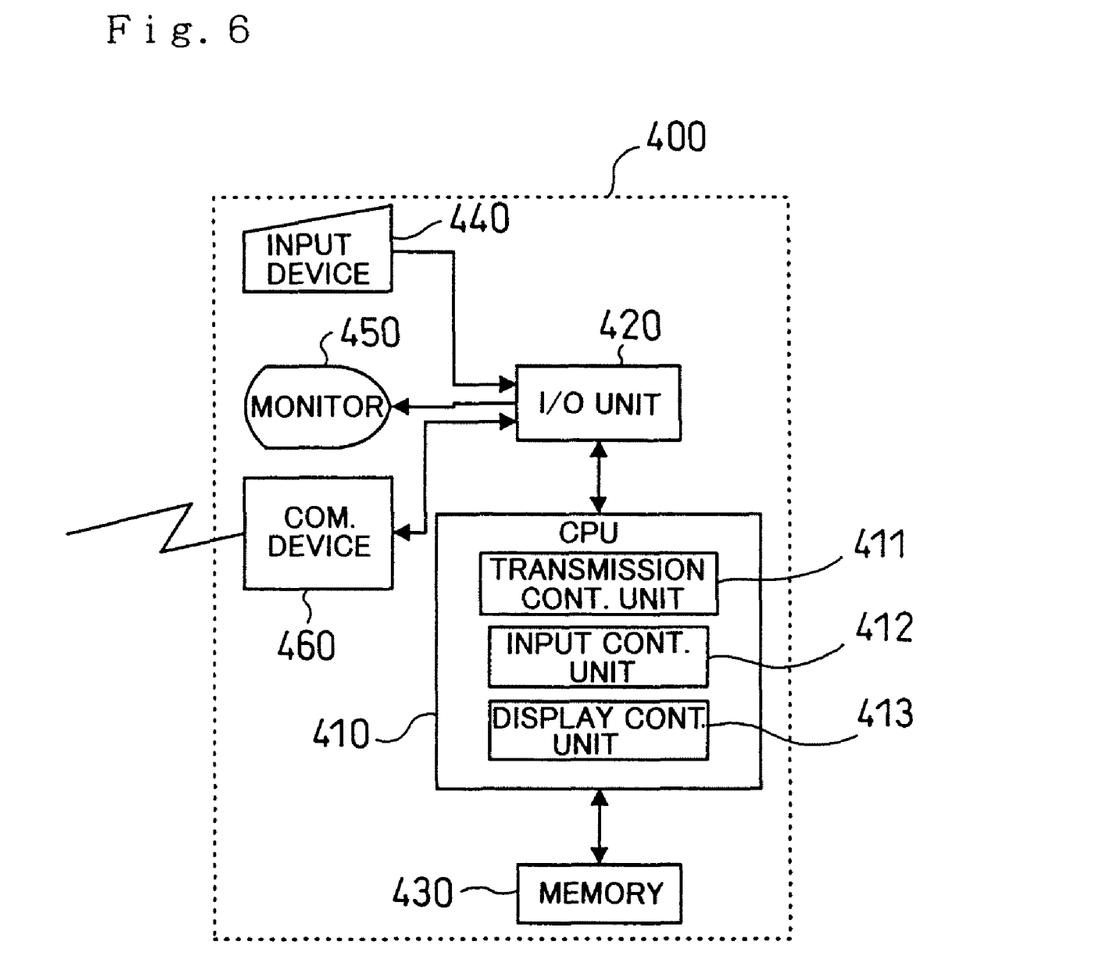
FIG. 6 is a block diagram illustrating the structure of a mobile terminal 400 used in an image data transfer system in a second embodiment according to the present invention.

FIG. 6 is a block diagram illustrating the structure of the mobile terminal 400 used in the image data transfer system in a second embodiment according to the present invention. The mobile terminal 400 is connected to the Internet 500 as shown in FIG. 2.

Referring to FIG. 6, the mobile terminal 400 includes a CPU 410 for carrying out a variety of processing and control operations according to programs, an I/O unit 420 that transmits data to and from a variety of peripheral devices, a memory 430 that stores the programs and temporarily registers data obtained in the course of the processing, an input device 440 for inputting, for example, an instruction from the user, a monitor 450 for displaying the contents of the data, and a communication device 460 that carries out communication with another apparatus through the network.

The CPU 410 carries out the operations according to the programs and thereby functions as a transmission control unit 411, an input control unit 412, and a display control unit 413.

In this embodiment, the variety of peripheral devices are integrally attached to the mobile terminal 400. The mobile terminal 400 has the size and the weight that enable the user to freely carry the mobile terminal 400.

In this embodiment, while the preview data is transmitted to the mobile terminal 400, the original image data is transmitted to the apparatus that is specified by the user of the mobile terminal 400. As shown in FIG. 6, the mobile terminal 400 does not have a hard disk drive or a printer. It is accordingly impossible for the mobile terminal 400 to store the original image data and print the contents of the image data even when the original image data is transmitted from the image data server 200. The original image data is accordingly transmitted to a desired apparatus other than the mobile terminal 400.

The following describes the operations of the second embodiment with referring to FIGS. 1 and 6. Among the operations of the second embodiment, the operations up to generation of the preview data in the image data server 200 are identical with those of the first embodiment and are thereby not specifically described here.

In the image data server 200, the transmission control unit 211 reads the generated preview data from the hard disk drive 270 and transmits the preview data via the communication device 260 to the client or mobile terminal 400. The transmission control unit 211 also reads the user interface data from the hard disk drive 270 and transmits the user interface data to the mobile terminal 400.

In the mobile terminal 400, the communication device 460 receives the transmitted preview data and user interface data, and the transmission control unit 411 of the CPU 410 stores the input preview data and user interface data into the memory 430. The preview data has an extremely smaller data capacity than that of the original image data and can thus be stored in the memory 430 without any troubles.

When the user of the mobile terminal 400 inputs an instruction for displaying a preview image through the operation of the input device 440, the input control unit 412 transfers the instruction to the display control unit 413. The display control unit 413 then reads the preview data and the user interface data from the memory 430 and causes the contents of the preview data and the user interface data on the screen of the monitor 450.

The user checks the preview image and determines whether or not the original image data corresponding to the preview data is required. When the corresponding original image data is required, the user inputs an instruction for displaying the window for print settings. The input control unit 412 then transfers the instruction to the transmission control unit 411, and the transmission control unit 411 transmits a request for transfer of the user interface data, which is used to display the window for print settings, to the image data server 200 via the communication device 460.

In the image data server 200, the communication device 260 receives the transmitted request for transfer, and the transmission control unit 211 reads the user interface data for displaying the window for print settings from the hard disk drive 270 and transmits the user interface data to the mobile terminal 400 via the communication device 260.

In the mobile terminal 400, the communication device 460 receives the transmitted user interface data, and the transmission control unit 411 stores the input user interface data into the memory 430. Simultaneously the display control unit 413 causes the user interface window of the user interface data, that is, the window for print settings, to be displayed on the screen of the monitor 450.

The windows for print settings displayed in the second embodiment are similar to those shown in FIGS. 4 and 5, except several additional data areas. The additional data areas include a data area for setting an address of transmission of the image data and a data area for setting a date and time for reserved transmission of the image data.

Information representing the location of an apparatus, to which the original image data is to be actually transmitted, (that is, an apparatus selected by the user to receive the original image data), on the Internet 500 is input into the data area for setting the address of transmission of the image data. Concrete examples of such information include an IP (Internet Protocol) address or URL (Uniform Resource Locator) of the desired apparatus. The apparatus, to which the original image data is to be transmitted, should have the capability to store the transmitted image data and print the contents of the image data. It is thus required for the user of the mobile terminal 400 to specify an appropriate apparatus having such capability as the address of transmission of the image data. In this embodiment, the computer system 100 in the image receiver apparatus is specified as the address of transmission of the image data. The user accordingly inputs the IP address of the computer system 100 in the image receiver apparatus into the data area for setting the address of transmission of the image data.

The date and time, when the original image data is to be transmitted from the image data server 200 to the specified address, is input into the data area for setting the date and time for reserved transmission of the image data. For example, when the computer system 100 in the image receiver apparatus specified as the address of transmission of the image data is remote from the mobile terminal 400, the user of the mobile terminal 400 can not grasp the current state of the computer system 100 in the image receiver apparatus. Even when the image data is transmitted from the image data server 200, there is a possibility that the computer system 100 in the image receiver apparatus can not receive the image data or print the contents of the image data. One preferable procedure specifies in advance the date and time when the image data server 200 will transmit the original image data and causes the computer system 100 in the image receiver apparatus specified as the address of transmission of the image data to prepare for receiving the image data. This arrangement enables the computer system 100 in the image receiver apparatus to securely receive the transmitted image data and print the contents of the image data.

The input control unit 412 transmits the various pieces of input setting information and the results of button clicking to the transmission control unit 411. When the OK button 155 is clicked in the window for print specification, the transmission control unit 411 transmits the setting information as well as the request for transfer of the original image data to the image data server 200 via the communication device 460.

In the image data server 200, when the communication device 260 receives the transmitted request for transfer and setting information, the transmission control unit 211 sets the date and time for reserved transmission of the image data into a timer while storing the setting information into the hard disk drive 270. The transmission control unit 211 then reads the original image data, which is the target of the request for transfer, and the setting information from the hard disk drive 270 on the date and time set in the timer for reserved transmission of the image data. The transmission control unit 211 subsequently transmits the image data and the setting information to the computer system 100 in the image receiver apparatus, based on the information representing the address of transmission of the image data.

The operations after the transmission of the image data from the image data server 200 in the second embodiment are identical with those of the first embodiment and are thereby not specifically described here.

As described above, the structure of the second embodiment enables the user of the mobile terminal 400 to visually check the preview image displayed on the mobile terminal 400. In the case where the original image data corresponding to the preview data is required, the user can receive the desired original image data in a desired apparatus.

The user interface data consists of the HTML data as described previously. When the user interface data has the mechanism for calling the software component to utilize the CGI, the mobile terminal 400 can remote control the functions of the image data server 200. This arrangement enables the image data server 200 to be in charge of the high-performance processing, when the CPU 410 of the mobile terminal 400 has a relatively low processing capacity.

The present invention is not restricted to the above embodiments or their modifications, but there may be many other modifications, changes, and alterations without departing from the scope or spirit of the main characteristics of the present invention.

In the above embodiments, the preview data is generated in the image data server 200. It is, however, not necessary to generate the preview data in the image data server 200. Another possible application generates the preview data in the computer system 300 of the image transmitter apparatus and transmits the preview data together with the corresponding original image data to the image data server 200.

In the above embodiments, the required image data is once transmitted from the computer system 300 in the image transmitter apparatus to the image data server 200. The preview data and the image data are then transmitted from the image data server 200 to the receiver, for example, the computer system 100 in the image receiver apparatus or the mobile terminal 400. The principle of the present invention is, however, not restricted to this arrangement. In the case where the computer system 300 in the image transmitter apparatus has the functions equivalent to those of the image data server 200, the preview data and the image data may be transmitted directly from the computer system 300 in the image transmitter apparatus to the receiver.

The above embodiments regard the transmission of image data. The principle of the present invention is, however, not restricted to this arrangement, but is applicable for transmission of text data. Namely, the 'original data' in this specification means various types of data, such as image data and text data. In the case of transmission of text data, the preview data generated corresponding to the text data may be abstract data representing an abstract of the text data, extraction data representing first several rows in the text data, or attribute data obtained by extracting the attribute information attached to the text data as discussed in the above embodiments. Namely, the 'preview image' in this specification means various types of images represented by data, such as preview image data and preview text data.

In the above embodiments, the image data server 200 is connected to the receiver via the Internet 500. The principle of the present invention is, however, not restricted to the Internet, but these apparatuses may be connected to each other via a telephone communication network, a LAN, a WAN (including an intranet), or any other network.

In the above embodiments, the contents of the preview data are displayed on the screen of the monitor. Alternatively the contents of the preview data may be printed on the printing paper with the printer. The contents of the image data are printed on the printing paper with the printer in the above embodiments. Alternatively the contents of the image data may be displayed on the screen of the monitor. Both the data may be output by any output means other than the monitor or the printer, in order to enable the user to visually check the contents of the data.

In the above embodiment, the image data transmitted from the computer system 300 in the image transmitter apparatus to the receiver via the image data server 200 consists of the gray-scale bit-map data of R, G, and B. The principle of the present invention is, however, not restricted to such image data, but is applicable to any image data having the data structure that is independent of the control codes of the printer or the like.

It should be clearly understood that the above embodiments are only illustrative and not restrictive in any sense. The scope and spirit of the present invention are limited only by the terms of the appended claims.

What is claimed is:

1. A method of transmitting data between a transmitter and a receiver each connected to a network, the method comprising the steps of:
   (a) causing the transmitter to transmit reduced image data, corresponding to image data, and user interface data to the receiver via the network, the reduced image data generated by a data-skipping operation;
   (b) causing the receiver to output visibly a reduced image represented by the reduced image data and a user interface image represented by the user interface data, when the receiver receives the reduced image data and the user interface data via the network;
   (c) causing the receiver to transmit a request for transfer of the image data and setting information to the transmitter via the network, when an instruction for transfer of the image data and the setting information is input into the receiver, wherein the setting information is used for outputting visibly an image represented by the image data; and
   (d) causing the transmitter to transmit the image data and at least part of the setting information to at least one of the receiver and an apparatus connected to the network, which is different from the receiver, via the network, when the transmitter receives the request for transfer and the setting information via the network.

2. The method of claim 1, wherein the reduced image data is attached to the image data.

3. The method of with claim 1, wherein the reduced image data has a smaller data capacity than that of the image data.

* * * * *